United States Patent
Keuschnigg

Patent Number: 5,238,475
Date of Patent: Aug. 24, 1993

[54] DEVICE FOR DUST SEPARATION FROM GASES

[76] Inventor: Josef Keuschnigg, Lormanberg 67, A-8324 Kirchberg (Steiermark), Austria

[21] Appl. No.: 920,419

[22] Filed: Jul. 27, 1992

[30] Foreign Application Priority Data

Aug. 14, 1991 [AT] Austria .................... 1607/91

[51] Int. Cl.$^5$ .................................... B01D 45/12
[52] U.S. Cl. ............................... 55/349; 55/459.1
[58] Field of Search ........................ 55/345–349, 55/459.1

[56] References Cited

U.S. PATENT DOCUMENTS

| 2,360,355 | 10/1944 | McBride et al. | 55/346 X |
| 2,667,944 | 2/1954 | Crites | 55/346 X |
| 4,746,340 | 5/1988 | Durre et al. | 55/348 X |

FOREIGN PATENT DOCUMENTS

| 392924 | 7/1991 | Austria . |
| 0264735 | 4/1988 | European Pat. Off. . |
| 1274426 | 8/1968 | Fed. Rep. of Germany . |
| 2753302 | 5/1979 | Fed. Rep. of Germany . |
| 3202240 | 7/1983 | Fed. Rep. of Germany . |

*Primary Examiner*—Charles Hart
*Attorney, Agent, or Firm*—Young & Thompson

[57] ABSTRACT

A device for dust separation from flue gases produced during combustion of solid waste comprises a housing (1) wherein an untreated gas chamber (3) is arranged. Several cyclone separators (10) are provided in the untreated gas chamber (3); the untreated gas enters the housings (12) of these separators by way of a tangential raw gas inlet (13). Furthermore, a pure gas chamber (7) is located in the housing (1), separated from the raw gas chamber (3) by a partition (5). The pure gas exits from the cyclone separators (10) through pipes (14) penetrating the partition (5) into the pure gas chamber (7). The cyclone separators (10) each include a dip pipe (14, 15) respectively projecting from the top and from the bottom into the separating chamber (11) provided in the housing (12) of the cyclone separators (10). The raw gas chamber (3) is separated at the bottom from a dust-collecting chamber (17) by means of a partition (6). The upper and lower dip pipes (14, 15) are in communication with the opening (9) for the discharge of pure gas from the housing (1) of the device.

12 Claims, 3 Drawing Sheets

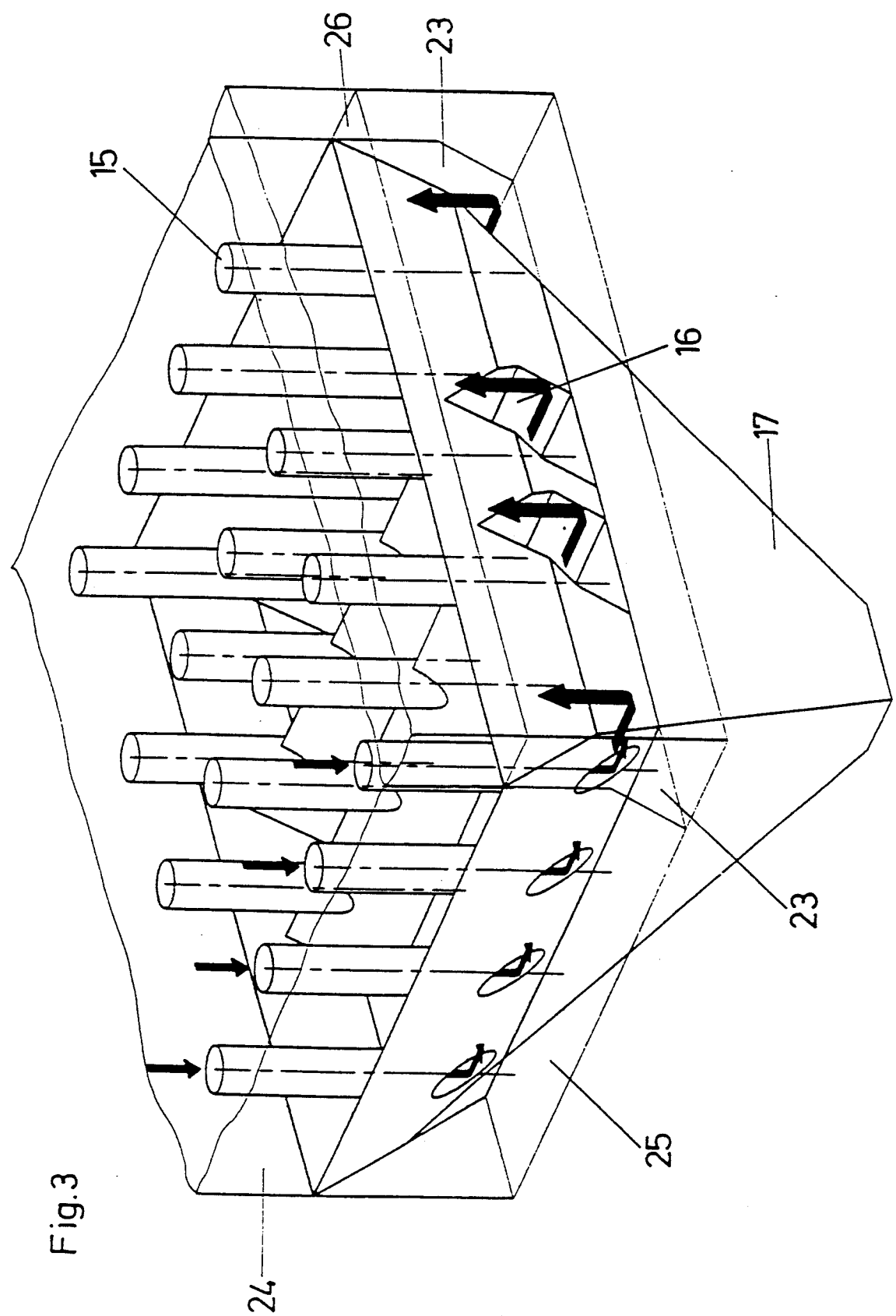

DEVICE FOR DUST SEPARATION FROM GASES

FIELD OF THE INVENTION

The invention relates to a device for dust separation from gases, especially flue gases produced in the combustion of solids and waste products, with a housing wherein an untreated gas chamber is provided, several cyclone separators being arranged in the untreated gas chamber, the untreated gas entering the housings of these separators via a tangential raw gas inlet, and with a pure gas chamber separated from the untreated gas chamber by a partition, pure gas exiting from the cyclone separators into the pure gas chamber through pipes penetrating the partition.

BACKGROUND OF THE INVENTION

Such a device has been known from DOS 2,753,302. This conventional device is intended, in particular, for the separation of dust from flue gases; for this purpose, the device is installed between a boiler and a suction fan or a chimney. The conventional device comprises a housing with an untreated gas chamber and a pure gas duct located thereabove, as well as with a dust-collecting chamber arranged below the untreated gas chamber. Furthermore, the conventional device has several cyclone separators arranged in rows one behind the other and in side-by-side relationship or in stepwise fashion obliquely superimposed. The raw gas to be purified, especially to be subjected to dust removal, enters into these cyclone separators tangentially and flows as pure gas upwardly through pipes from the cyclone separators into the pure gas duct and from the latter through an outlet opening out of the device. The lower ends of the cyclone separators, in the device known from DOS 2,753,302, penetrate the lower boundary wall of the raw gas chamber and are open toward the dust-collecting chamber arranged therebelow.

It is known from DOS 2,150,733 to arrange several small cyclones in devices for dust separation.

Dust separation facilities having high separating efficiencies are prescribed for furnace plants and for other installations emitting dust-laden gases, within the scope of stricter environmental protection regulations. It is difficult with the known devices to maintain the prescribed limit values of residual dust load in the pure gas discharged from the installations.

Cyclone separators have been known from EP-A 398,864 and, respectively, Austrian Patent 392,924 wherein pure gas is discharged from the separating chamber via two dip pipes projecting into this chamber and being located in axial opposition. These separators with two dip pipes (separators with double dip pipe) are substantially more efficient than the cyclone separators suggested, for example, in DOS 2,753,302.

SUMMARY OF THE INVENTION

The invention is based on the object of improving the separating efficacy of mechanical centrifugal dust separators of the cyclone separating principle in such a way that the required limit values for the dust load in the pure gas can be maintained.

This object has been attained according to this invention by providing that the cyclone separators in each case exhibit respectively one dip pipe projecting from the top and one dip pipe projecting from the bottom into the separating chamber arranged in the housing of the cyclone separators; that the raw gas chamber is separated at the bottom by a partition from a dust-collecting chamber; and that the upper and lower dip pipes are in communication with the opening for the discharge of the pure gas from the housing of the device.

Advantageous embodiments of the device according to this invention form the subject matter of the dependent claims.

In the device of this invention, the cyclone separators can be connected in parallel or in series, combinations of these two design possibilities being likewise feasible.

The use of cyclone separators with two dip pipes, as proposed according to this invention, renders the device of this invention substantially more efficacious so that the above-described objectives can be attained in a more economical fashion. This is achieved primarily by the feature that a higher throughput efficiency is possible, on account of the double dip pipe principle adopted in the cyclone separators utilized according to this invention, than with cyclones having only a single dip pipe, so that a substantially lower number of separators need to be installed in the device.

In one embodiment of the invention, a shielding cone is provided at the lower dip pipe, i.e. the dip pipe extending from below into the separating chamber of the cyclone separator; this cone is fashioned, for example, as a baffle having the shape of a shell of a truncated cone, tapering from the bottom toward the top and being attached with its smaller end to the dip pipe. This prevents the formation of eddies and flush-back effects in the region of the lower dip pipe, this region also containing the outlet for the separated dust and the like from the cyclone separator. Such effects can carry dust from the dust-collecting chamber back into the upper dip pipe and thus into the pure gas portion of the device.

The number of cyclone separators in accordance with the double dip pipe principle utilized in the device of this invention is chosen in correspondence with the determined amount of untreated gas so that, depending on the required output of the device, a corresponding number of cyclone separators is provided in dependence on the amount of untreated gas to be treated. Since a higher throughput efficacy is possible on account of the double dip pipe principle than with other, known cyclone separators (cyclones) with only one dip pipe, the number of cyclone separators used in the devices of the type discussed hereinabove can be kept smaller or, alternatively, dip pipes can be employed having a smaller cross section, which is advantageous for the separating efficiency.

Even relatively small grain sizes are effectively separated with the device of this invention on account of the provision of the two dip pipes. The output of the device according to this invention remains the same even with smaller dip pipe cross sections, on account of the two dip pipes extended toward the outside from the separating chamber of the cyclone separators used according to this invention. Consequently, the number of cyclone separators need not be increased and, as a further consequence, no increase in expenses is encountered. Thus, it is also possible to utilize cyclone separators having dip pipes with a comparatively small cross section, which further enhances separating intensity.

In one embodiment of the invention, the untreated gas duct and the dust-collecting chamber can be divided by an approximately horizontal partition, and the pure gas duct can be divided in the same way by a partition, openings being provided in the bottom of the untreated gas duct which receive the bottom ends of the individual cyclone separators of the device according to the invention. The housings of these cyclone separators are sealed with respect to the partition.

The upper dip pipes of the cyclone separators are extended through the upper partition closing off the raw gas chamber in the upward direction and are sealed with respect to this partition.

The pure gas discharged from the lower dip pipes out of the cyclone separators utilized according to the invention is removed, in one embodiment, via collecting ducts (pure gas ducts). This step also makes it possible to install the device of this invention in existing facilities.

Also the external shape of the housing of the device according to this invention can be designed so that installation into existing facilities is possible without problems, wherein also the design parameters of such dust separation installations can be essentially retained.

Based on the construction of the device in accordance with this invention, dust separation efficiencies of 95-98% can be obtained. Such dust removal efficacies cannot be attained by means of conventional, mechanical centrifugal dust separators of comparable industrial usage.

The device of this invention and its construction also permit a design favorable from the viewpoint of flow dynamics. Thus, it is proposed according to this invention, for example, to fashion the inlet spiral of the cyclone separators used according to this invention to be of a trumpet shape.

In the device of this invention, the pure gas exits from each cyclone separator via the two dip pipes in the upward and, respectively, downward directions. The pure gas discharged from the upwardly oriented dip pipes enters the pure gas chamber directly, for example. The pure gas discharged via the downwardly pointing dip pipes, constituting about 50% of the pure gas, can be conducted through collecting ducts and can be fed via a further duct into the upper pure gas chamber and can be discharged from the device via this latter chamber together with the pure gas flowing out of the upper dip pipes.

However, it is also possible to extend the upper pure gas chamber via one or several ducts to the lower pure gas duct(s) and to make such a connection therewith that the pure gas can be discharged by way of the lower pure gas ducts.

It is advantageous in the device of this invention to seal the dust-collecting chamber gastight by way of a dust gate valve or a comparatively tight dust-sealing element so that approximately the same vacuum pressure is obtained in the dust-collecting chamber as in the raw gas chamber and thus no backflow is made possible to the dust-discharge slot from the separating chamber of the cyclone separators utilized in the device of this invention.

Additional embodiments of double dip pipe separators usable within the scope of this invention are known from EP-A 398,864. These separators exhibit the advantage that they operate at lower pressure losses as compared with conventional cyclone separators.

It is also possible in this invention to arrange the outlet opening for pure gas in the housing of the device between the upper pure gas chamber and the lower pure gas ducts.

Another advantage in the device of this invention resides in that the housings of the cyclone separators can be attached over the lower dip pipes without connection so that the manufacture of a separating chamber housing can proceed in economical fashion in a similar manner as the individual separating chamber housings of conventional cyclones.

Due to the mounting of sealing elements in the zone of the through bores of the separators of this invention through the partitions and/or the bottom of the raw gas or pure gas duct, the required sealing presents no problem with a perfect machining and proper fitting of the separators.

Although the discharging of pure gas via the lower dip pipes of the cyclone separators used according to this invention initially represents an additional expenditure, the output of the individual separator and thus that of the device in total is increased to double the amount so that, on the whole, advantages and improved economy are obtained for the device according to this invention.

BRIEF DESCRIPTION OF THE DRAWINGS

Further details, features and advantages of the invention can be derived from the following description of the preferred embodiment of a device according to the invention as shown in the drawings wherein:

FIG. 3 shows in an oblique view a detail of the lower portion of the device.

DETAILED DESCRIPTION OF THE INVENTION

Figure 2:
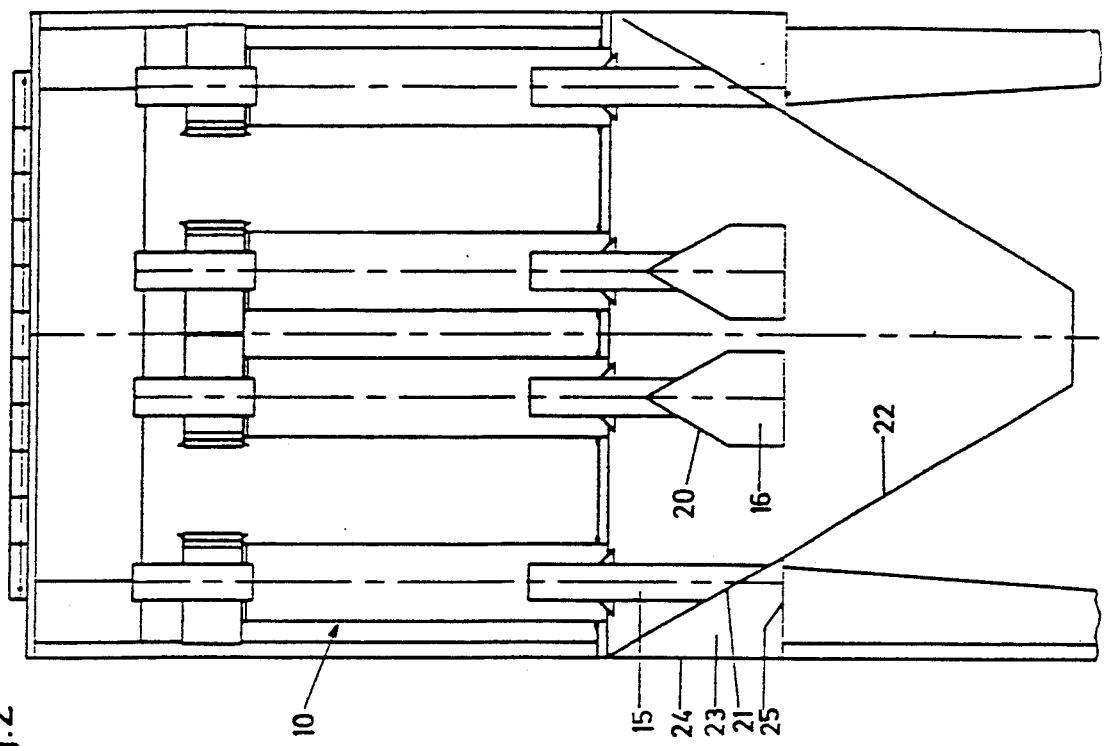
FIG. 2 shows the device of FIG. 1 in a vertical sectional view perpendicular to the sectional view of FIG. 1.
Figure 1:
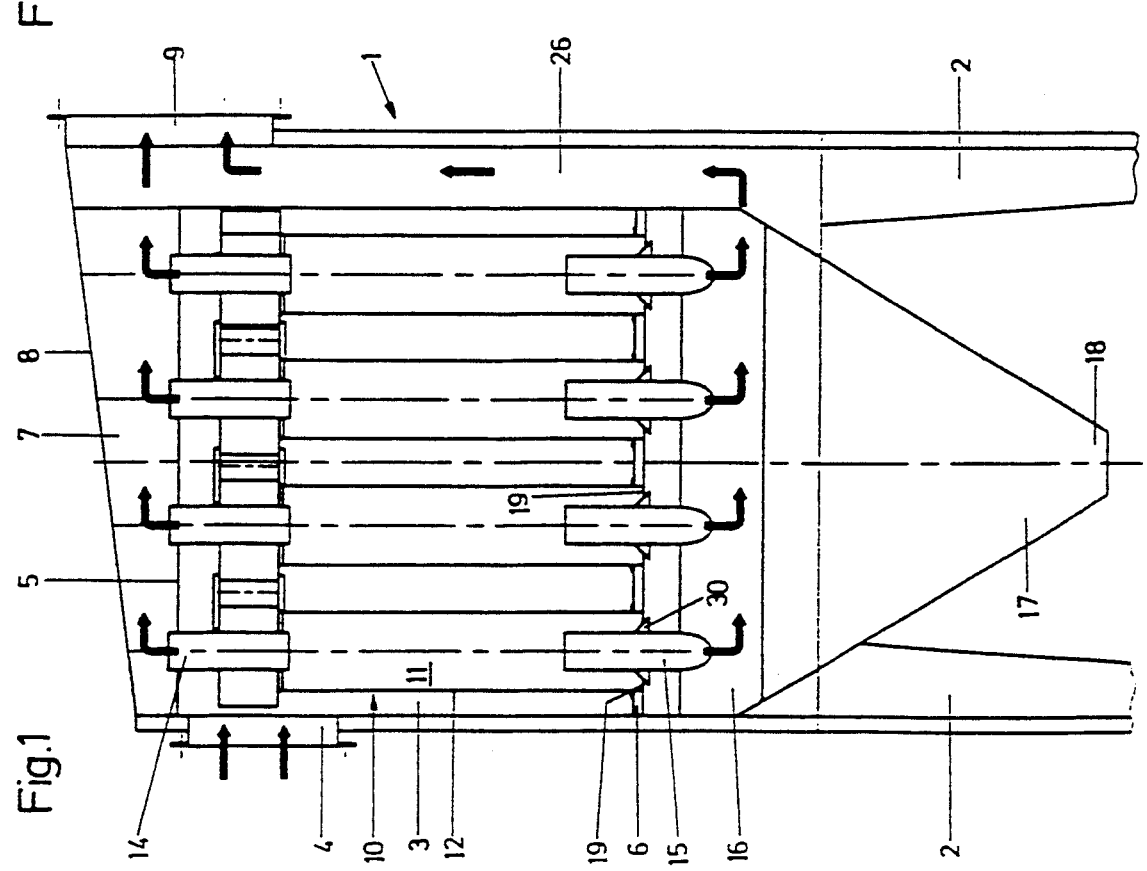
FIG. 1 shows the device in a vertical sectional view.

The device comprises a housing 1 positioned on the floor by way of feet 2.

A space 3 (untreated gas chamber) is provided in the housing 1, untreated gas flowing into this space through an inlet 4. The chamber 3 is closed off at the top by an upper terminal wall 5 and at the bottom by a lower terminal wall 6.

A pure gas chamber 7 is arranged above the upper terminal wall 5, this chamber being defined in the upward direction by an upper end wall 8.

Pure gas is discharged from the pure gas chamber 7 through an outlet opening 9.

Figure 4:
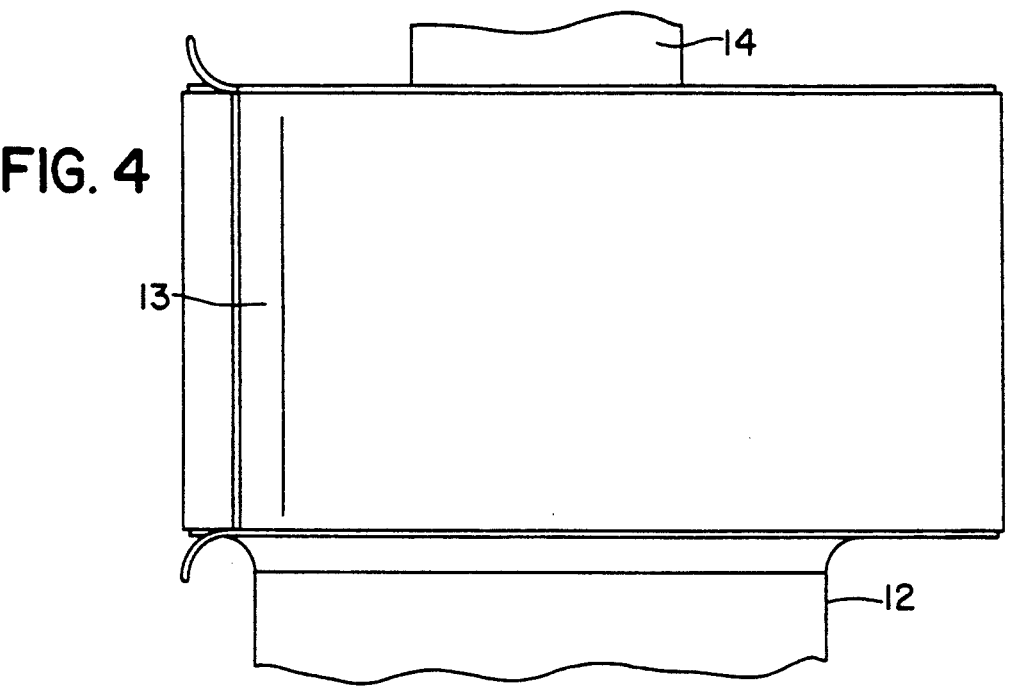
FIG. 4 shows the inlet of a cyclone separator of the type of structure utilized in the device according to FIG. 1.
Figure 5:
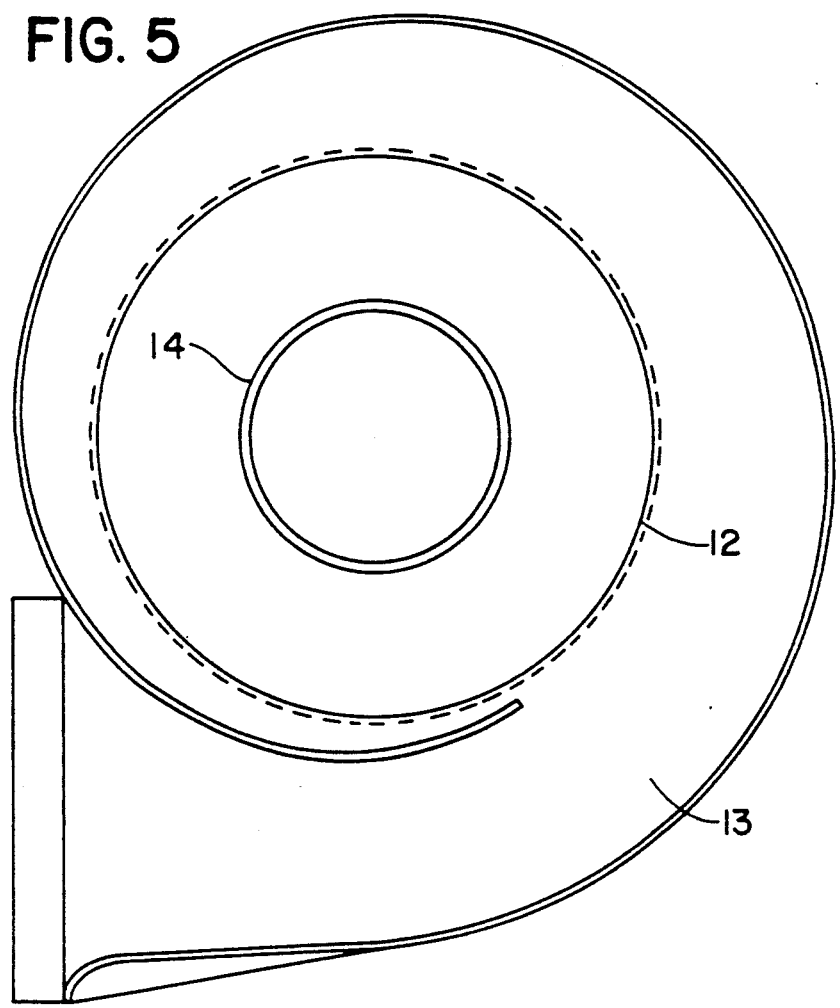
FIG. 5 shows a section along line A—A in FIG. 4.

In the chamber 3 of the device according to this invention, several perpendicularly oriented fluidized-bed separators 10 are provided. Each cyclone separator 10 comprises a housing 12 having the shape of a cylindrical shell and defining a separating chamber 11, raw gas flowing into the separating chamber 11 through the inlet 13 shown in FIGS. 4 and 5. As illustrated in FIGS. 4 and 5, the inlet 13 is designed to be of spiral shape and tapering in the manner of a trumpet from the outside toward the inside, with an inlet port of a design favorable from the viewpoint of flow dynamics.

Dip pipes 14 and 15 extend from the separating chamber 11 of the cyclone separators 10, pure gas exiting through these pipes from the cyclone separator 10. In this arrangement, the upper dip pipes 14 of the cyclone separators 10 pass through the upper boundary wall 5

(optionally with insertion of gaskets) whereas a portion of the lower dip pipes 15 terminates into pure gas collecting ducts 16 provided in the lower portion of the housing 1 in horizontal alignment.

Untreated gas entering through the inlet 13 is set into a rotary motion whereby dust and gas in the separating chamber 11 are separated from each other to such an extent that the dust is flung against the inside of the housing 12 and migrates downwardly to an exit slot 19 from which the dust is discharged into a dust-collecting chamber 17.

Dust discharge connections, not shown, are arranged at the lower end 18 of the dust-collecting chamber 17; these connections can be closed off in leakage-tight fashion, for which purpose a dust gate valve or another closable dust discharge element can be provided, for example.

As shown in FIG. 2, in particular, the upper boundaries 20 of the pure gas ducts 16 are designed in the shape of a gable roof in order to prevent dust from being deposited thereon or to cause any dust settled on the roof to slide off into the lower end 18 of the dust-collecting funnel 17.

As can likewise be seen from FIG. 2, the lower dip pipes 15 of the cyclone separators 10 arranged in the housing 1 and/or in the space 3 on the rim side are not connected to pure gas ducts 16 but rather are in communication, via openings 21 in the wall 22 of the dust-collecting funnel 17, with ducts 23 defined by the lower zone of the wall 24 of the housing 1, the upper portion of the wall 22 of the dust-collecting funnel 17, and a lower end wall 25.

Pure gas flows from the pure gas ducts 16 via a connecting duct 26 extended upwardly along the wall 24 of the housing 1 into the upper pure gas chamber 7 and then out of the device through the outlet aperture 9.

It should furthermore be noted that baffles 30 having the shape of a truncated cone shell are provided in the zone of the annular-slot-like dust outlet openings 19 of the cyclone separators 10 which are inserted with their lower ends in sealing fashion (optionally with the insertion of gaskets) in corresponding openings in the lower boundary wall 6 of the untreated gas chamber 3.

An advantageous embodiment of the device according to this invention provides that the lower dip pipes 15 are supported exclusively by the pure gas ducts 16 and, respectively, by the wall 22 of the dust-collecting funnel 17 so that these pipes are not in physical connection with the remaining parts of the cyclone separators 10.

What is claimed is:

1. In a device for the separation of dust from gases, comprising a housing containing a raw gas chamber, several cyclone separators in the raw gas chamber, a raw gas inlet through which untreated gas enters said separators via tangential raw gas inlets, said housing also containing a pure gas chamber separated from the raw gas chamber by a wall, with pure gas flowing from the cyclone separators into the pure gas chamber through pipes penetrating the wall; the improvement wherein the cyclone separators each have a dip pipe extending upwardly and a dip pipe extending downwardly from a separating chamber in the cyclone separators; said raw gas chamber being separated at the bottom by a partition from a dust-collecting chamber; said upwardly and downwardly extending dip pipes communicating with an outlet for the discharge of pure gas from the housing; said upwardly-extending dip pipes terminating directly in said pure gas chamber; said downwardly-extending dip pipes communicating with pure gas ducts which penetrate the dust-collecting chamber and are fluidly connected to said outlet; and wherein several of said downwardly-extending dip pipes extend through apertures located in a funnel-shaped part of said dust-collecting chamber into ducts for the efflux of pure gas outside of the funnel and inside a lower section of a housing wall.

2. Device according to claim 1, further including openings in said partition, said openings receiving lower ends of said cyclone separators, and exit slots located at the lower ends of the separators, for dust separated in the cyclone separators, said exit slots terminating directly in said dust-collecting chamber.

3. Device according to claim 2, further comprising upwardly tapering baffles having the shape of a truncated cone disposed adjacent the exit slots for dust separated in the cyclone separators.

4. Device according to claim 1, wherein several downwardly-extending dip pipes are fluidly connected in common to a same pure gas duct.

5. Device according to claim 1, wherein the pure gas ducts taper on their topside in the manner of a gabled roof.

6. Device according to claim 1, wherein the dust-collecting chamber has a downwardly tapering funnel shape and a dust discharge opening at the lower end thereof.

7. Device according to claim 1, wherein said downwardly-extending dip pipes are supported exclusively by said pure gas ducts and by an outer wall of the dust-collecting chamber.

8. Device according to claim 1, wherein said pure gas ducts are fluidly connected to the pure gas chamber by a connecting duct.

9. Device according to claim 1, wherein at least a portion of the downwardly-extending dip pipes extend directly to and terminate in the pure gas chamber.

10. Device according to claim 1, wherein the raw gas inlets into the cyclone separators are of spiral shape and flare toward an inlet opening.

11. Device according to claim 1, wherein the outlet for the discharge of pure gas is located in an upper region of the housing.

12. Device according to claim 1, wherein the dust-collecting chamber is sealed gastightly.

* * * * *